Patented Oct. 9, 1951

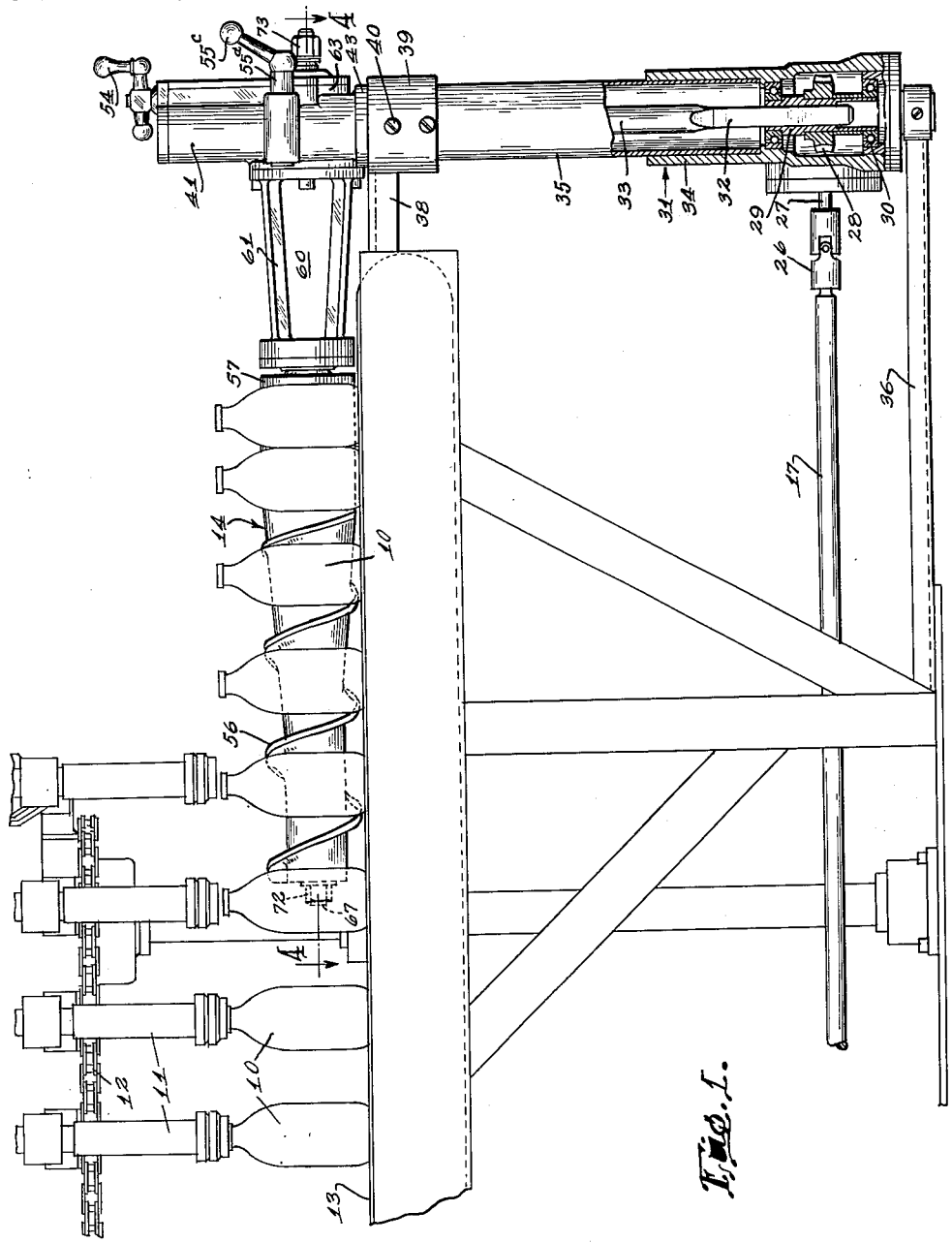

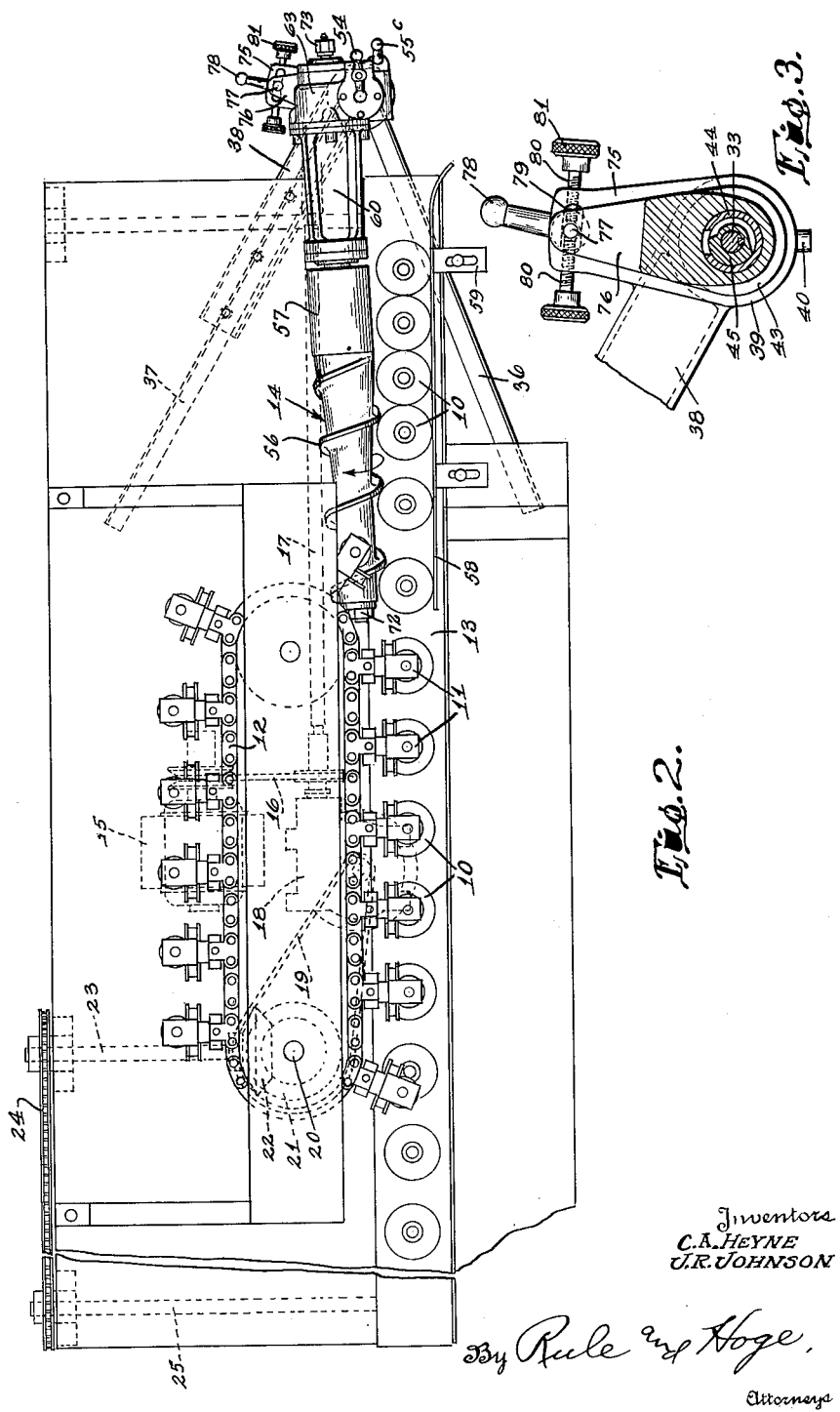

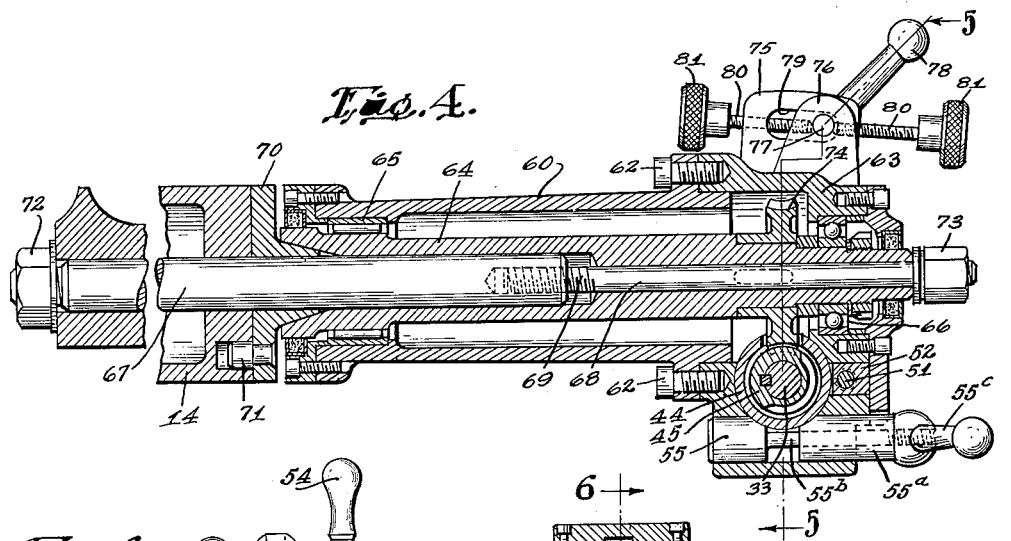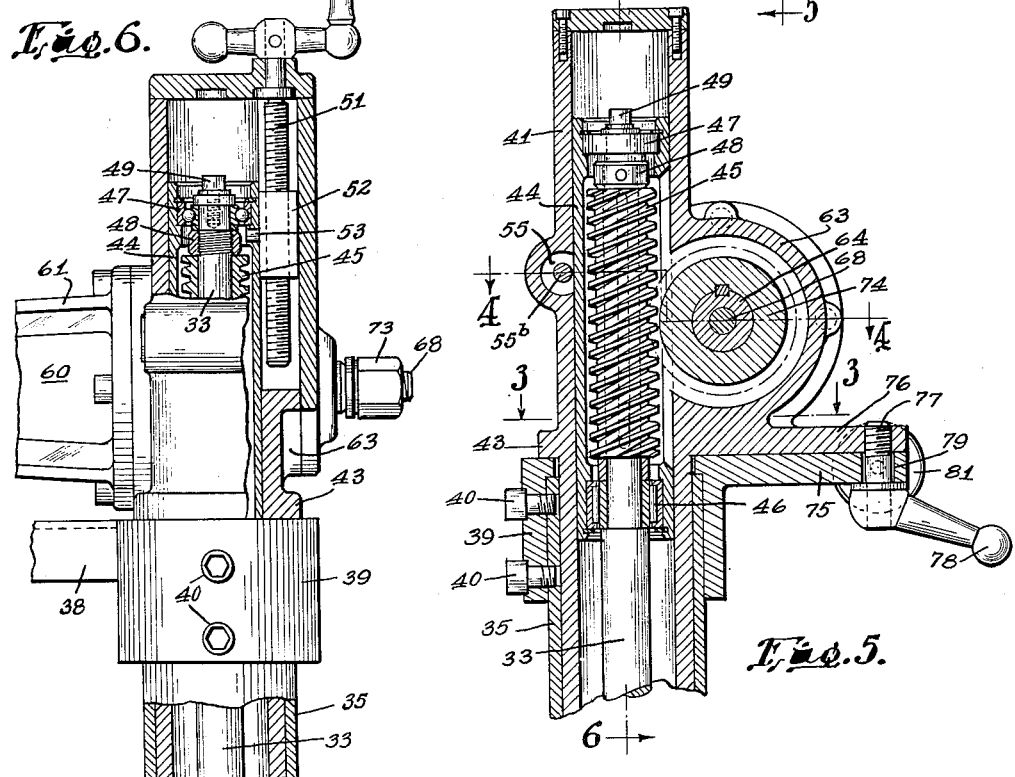

2,571,036

UNITED STATES PATENT OFFICE 2,571,036

ARTICLE CONVEYING AND TIMING MECHANISM

Clarence A. Heyne and John R. Johnson, Alton, Ill., assignors to Owens-Illinois Glass Company, a corporation of Ohio Application January 29, 1948, Serial No. 5,124

9 Claims. (Cl. 198—34)

Our invention relates to mechanism for conveying articles or workpieces and feeding them to a machine by which gauging, testing, or other operations are performed on or in connection with such articles. The invention provides mechanism by which a continuous supply of the articles are fed to a machine comprising a plurality of operating units, means for spacing the articles as they are advanced to correspond to the spacing of such operating units, and means for synchronizing and timing the movements of the articles with those of the operating units.

In the form herein illustrated, there is provided a conveyor by which bottles or other articles are fed to a gauging machine comprising a series of continuously traveling gauging units for receiving and operating upon the articles in succession. An object of the invention is to provide an improved spiral timer device for spacing the articles on the conveyor to correspond with the spacing of the traveling gauging or other units, and adjusting means for synchronizing the feed of the articles to bring them in register with the traveling units.

A further object of the invention is to provide adjusting mechanism by which the spiral timer feeder may be adjusted, without stopping or interfering with the continuous operation of the machine, to synchronize the feed of the articles with the movements of the gauging or other units which act upon said articles, whereby the articles are accurately positioned with respect to such units.

Other objects of the invention will appear hereinafter.

Referring to the accompanying drawings:

Fig. 1 is an elevation view of a portion of a gauging machine combined with a conveyor and timer feeder for feeding articles to such machine, parts of the machine being broken away and parts of the apparatus being shown in section;

Fig. 2 is a top plan view, parts of the gauging machine being broken away;

Fig. 3 is a sectional view showing the adjusting means for adjusting the angular position of the spiral timer feeder, the section being taken at the line 3—3 on Fig. 5;

Fig. 4 is a horizontal section of the timer conveyor and driving means therefor, parts being broken away, the section being at the lines 4—4 on Figs. 1 and 5;

Fig. 5 is a sectional elevation at the line 5—5 on Fig. 4; and

Fig. 6 is a part-sectional elevation as indicated by the line 6—6 on Fig. 5, showing adjusting means for rotatively adjusting the spiral timer conveyor and thereby adjusting the feed of the articles to cause them to register with the gauging units.

Referring to Figs. 1 and 2, the invention is herein illustrated as adapted for use with a gauging machine for gauging articles 10 such as bottles or jars. The machine comprises a series of gauging units 11 connected to an endless chain carrier 12 for continuous travel in a horizontal closed path, the units being spaced at equal intervals. The articles 10 are placed on a horizontally traveling endless belt conveyor 13 near the right hand end thereof and as they are advanced by the conveyor, they are spaced horizontally by a spiral or helical feeder 14. The feeder 14 serves as a timer by which the movements of the articles 10 are synchronized with the movements of the gauging units so that the articles are brought in succession directly beneath and in register with the gauging units, the spacing between centers of the articles being equal to the spacing between the centers of the gauging units.

The conveyor 13 and spacing screw or timer 14 are driven in synchronism by an electric motor 15 (Fig. 2). The motor is geared through a driving belt or chain 16 to a horizontal shaft 17 which is connected through transmission gearing within a gear box 18 to drive an endless belt 19 geared to a shaft 20. The shaft 20 has driving connections with the conveyor 13 through a train of gearing comprising bevelled gears 21, 22, shaft 23, chain 24, shaft 25, the conveyor being trained over a drive pulley on the shaft 25.

The shaft 17 is connected through a universal joint 26 (Fig. 1) to the shaft 27 of a worm which drives a worm wheel 28 keyed to a short vertical tubular shaft 29 journalled by means of ball bearings 30 within a stationary hollow column 31. The bore of the shaft 29 is rectangular to receive the squared end section 32 of a vertical worm shaft 33 adjustable up and down therein as hereinafter described.

The column 31 comprises a lower section or base 34 and an upper section 35. The column is connected to the machine framework by means of lower horizontal diagonal bars 36 and 37 (Figs. 1 and 2) and an upper horizontal diagonal bar 38, the latter being provided with a collar 39 surrounding the column 35 and secured thereto by screw bolts 40.

Supported on the column 35 is a tubular case 41 which, as shown in Figs. 5 and 6, extends downwardly within said column and at its lower end is provided with a packing gland 42 surrounding the worm shaft 33. The case 41 is formed with a flange 43 which rests on the collar 39. Mounted for up-and-down adjustment within the case 41 is an inner tubular case 44 in which is a worm 45 mounted on the shaft 33. The worm shaft 33 is journalled in bearings 46 and 47 at the lower and upper ends respectively of the case 44. The worm shaft is attached at its upper end to the ball bearing cage by means of a nut 48 and cap screw 49.

Means for adjusting the worm 45 up and down together with its casing 44 and shaft 33, includes a vertical adjusting screw 51 which is threaded through a nut or sleeve 52 (Figs. 4 and 6). The nut is mounted for up-and-down movement in the outer casing 41 and is connected to the inner case 44 by a pin 53. The screw shaft 51 is rotated by means of a hand crank 54.

The inner case 44 is clamped in its adjusted position and held against rotative movement by a clamping device comprising clamping elements 55 and 55ᵃ (Fig. 4). The member 55 is formed with a stem 55ᵇ extending through a bore in the member 55ᵃ and having its outer end screw-threaded to receive a hand crank 55ᶜ. The latter serves to release the clamp to permit adjustment of the case 44, and to then draw the clamping elements inwardly to grip the wall of the case 44.

The timer 14 comprises a horizontally disposed tubular shaft formed with a spiral thread 56. The shaft, as shown, is tapered toward its forward or free end and the pitch of the spiral thread is gradually increased toward the forward end, thereby correspondingly widening the spaces between adjacent convolutions for the purpose of spacing the bottles to correspond to the spacing of the gauging units 11.

The right hand end portion of the timer shaft is formed with a cylindrical surface 57 (Fig. 2) and the depth of the spiral thread 56 is gradually decreased toward said surface and merges into it at the forward end of the cylindrical surface.

Stationary guide rails 58 are mounted over the belt conveyor and extend lengthwise thereof in position to direct the articles 10 and bring them within the control of the spiral timer as they advance with the conveyor. The guide rails are carried on brackets 59 by means of which the rails are adjustable to accommodate them to articles of different sizes.

The spiral timer 14 is supported by means of a horizontal tubular arm 60 formed with ribs 61, said arm being attached by screw bolts 62 to a head 63 formed integral with the case 41. Rotatively mounted within the arm 60 and extending lengthwise therethrough is a tubular shaft 64 journalled at one end in roller bearings 65 in the arm 60 and at its other end journalled in ball bearings 66 within the head 63. Extending lengthwise through the tubular timer screw 14 and the arm 60 is a shaft comprising sections 67 and 68 having a screw-threaded connection 69 within the shaft 64. Driving connections between the shaft 64 and the timer shaft 14 comprise a disk 70 formed with a tapered hub engaging the correspondingly tapered edge of the shaft 64. The disk 70 is connected to the timer 14 by a pin 71. The parts are clamped together by clamping nuts 72, 73 on the outer ends of the sectional shaft 67, 68, said sectional shaft serving as a tie rod and also as a support for holding the timer shaft 14 in line with the shaft 64.

Keyed to the shaft 64 is a worm wheel 74 which runs in mesh with the worm 45. It will now be apparent that the shaft 17 has a driving connection with the spiral timer, said connection including the worm gear 28 (Fig. 1), the vertical shaft 33, worm 45, worm wheel 74 and shaft 64. The gearing is so proportioned that the timer 14 makes one complete revolution while the gauging heads travel the distance between centers of adjacent heads.

The timer shaft 14 is angularly adjustable horizontally about the axis of the column 35 and shaft 33, such adjustment being provided for by the following construction:

The collar 39 is formed with an integral radial arm 75 and the case 41 is formed with an arm 76 overlying the arm 75 and clamped thereto by means of a screw 77 rotatable by a handle 78. The screw 77 extends through an arc-shaped slot 79 in the arm 76 and is threaded into the arm 76. Adjusting screws 80 provided with knurled heads 81, are mounted in the arm 76 and positioned to engage the screw 77, thereby providing means for rotatively adjusting the case 41 and with it the spiral timer 14 about the axis of the worm shaft 33.

The operation may be summarized as follows:

The continuously traveling gauging units 11 are brought in succession directly over the belt conveyor 13 and advance therewith at the same speed as the conveyor. The containers 10 are supplied continuously to the conveyor 13 at the right hand end thereof and as they move forward with the conveyor, are uniformly spaced apart by the spiral timer 14 and by such spacing movement are so positioned on the conveyor that they are brought into direct vertical line or register with the gauging units. Each said unit, as it is brought over a container and in register therewith, is lowered onto the container for a gauging operation, as for example, to gauge the diameter of the neck opening of the container.

If the timer 14 moves the containers either in advance of or behind the position required for registration with the gauges, the timer is rotatively adjusted by adjusting the worm 45 (Figs. 5 and 6) either up or down, thereby rotatively adjusting the worm gear 74 and with it the spiral timer. Such adjustment is effected by first releasing the clamp 55 and then rotating the hand crank 54. This adjustment may be accomplished while the machine is in continuous operation. The timer may likewise be angularly adjusted horizontally about the axis of the vertical worm shaft 33 by loosening the clamping screw 77 (Figs. 3 and 5) by means of the hand lever 78 and then operating the adjusting screws 80 to rotate the casing 41 and with it the timer 14.

Modifications may be resorted to within the spirit and scope of our invention.

We claim:

1. The combination of a horizontal traveling conveyor for advancing articles placed thereon, a timing device for spacing the articles placed on the conveyor and timing their advance with the conveyor, said timing device comprising a horizontal shaft positioned over the conveyor and extending in the direction of the travel of the conveyor, the timing device having a spiral surface for engaging articles placed on the conveyor, the spacing of adjacent convolutions of the spiral being progressively increased in a forward direction for gradually increasing the spacing between adjacent articles placed on the conveyor in engagement with said spiral, a motor, means providing driving connections from the motor to the said conveyor and timing device and interconnecting the conveyor and timing device for rotating the timing device in synchronism with the travel of the conveyor, and manually operable means for rotatively adjusting the timing device about the axis of said shaft while the conveyor and timing device are being driven by the motor and thereby adjusting the positional relation of the timer to the conveyor.

2. The combination of a horizontal traveling conveyor for advancing articles placed thereon, a timing device for spacing the articles placed on the conveyor and timing their advance with the conveyor, said timing device comprising a horizontal shaft positioned over the conveyor and extending in the direction of the travel of the conveyor, the timing device having a spiral surface for engaging articles placed on the conveyor, the spacing of adjacent convolutions of the spiral being progressively increased in a forward direction for gradually increasing the spacing between adjacent articles placed on the conveyor in engagement with said spiral, a motor for driving said timing device, transmission mechanism between the motor and said timing device including a worm shaft, a worm thereon, a worm gear running in mesh with said worm and having a driving connection with the timing device, and means for adjusting the worm shaft in an axial direction and thereby rotatively adjusting the said worm gear and the said timing device.

3. The combination of a horizontal traveling conveyor for advancing articles placed thereon, a timing device for spacing the articles placed on the conveyor and timing their advance with the conveyor, said timing device comprising a horizontal shaft positioned over the conveyor and extending in the direction of the travel of the conveyor, the timing device having a spiral surface for engaging articles placed on the conveyor, the spacing of adjacent convolutions of the spiral being progressively increased in a forward direction for gradually increasing the spacing between adjacent articles placed on the conveyor in engagement with said spiral, a motor, a train of gearing extending from the motor to said timing device for driving the latter, said gearing including a vertical shaft, a worm thereon, a horizontal shaft connected to the timer, a worm wheel on said horizontal shaft and running in mesh with said worm, and means for adjusting said worm vertically and thereby rotatively adjusting the worm wheel and timer device.

4. The combination of a horizontal traveling conveyor for advancing articles placed thereon, a timing device for spacing the articles placed on the conveyor and timing their advance with the conveyor, said timing device comprising a horizontal shaft positioned over the conveyor and extending in the direction of the travel of the conveyor, the timing device having a spiral surface for engaging articles placed on the conveyor, the spacing of adjacent convolutions of the spiral being progressively increased in a forward direction for gradually increasing the spacing between adjacent articles placed on the conveyor in engagement with said spiral, a motor, a train of gearing extending from the motor to said timing device for driving the latter, said gearing including a vertical shaft, a worm thereon, a horizontal shaft connected to the timer, a worm wheel on said horizontal shaft and running in mesh with said worm, a stationary support in which said worm and worm wheel are journalled, and means for adjustably rotating said support about the vertical axis of said worm and thereby adjusting said timer horizontally about said axis.

5. A horizontally extending timer device formed with a spiral guiding surface, a horizontal shaft attached to said timer device and extending in line therewith, a stationary casing in which said shaft is journalled, a vertical drive shaft, a worm and intermeshing worm wheel connected respectively to said vertical and horizontal shafts, and means for rotatively adjusting said casing about the axis of said vertical shaft and thereby adjusting said timer device horizontally.

6. A horizontally extending timer device formed with a spiral guiding surface, a horizontal shaft attached to said timer device and extending in line therewith, a stationary casing in which said shaft is journalled, a vertical drive shaft, a worm and intermeshing worm wheel connected respectively to said vertical and horizontal shafts, means for adjusting said worm and worm shaft vertically and thereby adjustably rotating the timer about its longitudinal axis, and means for rotatively adjusting said casing about the vertical axis of said worm shaft, and thereby angularly adjusting the said timer device about said vertical axis.

7. The combination of a vertical worm shaft, a worm thereon, an inner casing in which said shaft is journalled, an outer stationary casing within which said inner casing is enclosed, a radial arm attached to and extending horizontally from said outer casing, a horizontal shaft journalled in said arm, a spiral timer carried by said horizontal shaft, a worm wheel keyed to said horizontal shaft and running in mesh with said worm, said worm wheel being journalled within said outer casing, driving means for rotating said vertical shaft and thereby rotating said spiral timer, and means for adjusting said inner casing up and down within the outer casing for rotatively adjusting the timer about its horizontal axis.

8. The combination of a vertical worm shaft, a worm thereon, an inner casing in which said shaft is journalled, an outer stationary casing within which said inner casing is enclosed, a radial arm attached to and extending horizontally from said outer casing, a horizontal shaft journalled in said arm, a spiral timer carried by said horizontal shaft, a worm wheel keyed to said horizontal shaft and running in mesh with said worm, said worm wheel being journalled within said outer casing, driving means for rotating said vertical shaft and thereby rotating said spiral timer, means for adjusting said inner casing up and down within the outer casing for rotatively adjusting the timer about its horizontal axis, said adjusting means comprising a vertical screw shaft journalled in the outer casing, a connector threaded on said screw shaft and movable up and down in guideways within the casing, means for attaching said connector to said inner casing, and means for rotating said screw shaft.

9. In combination with the means set forth in claim 7, means for rotatively adjusting said outer casing horizontally about the vertical axis of the worm shaft, and means for securing the outer casing in its adjusted position.

CLARENCE A. HEYNE.
JOHN R. JOHNSON.

REFERENCES CITED

The following references are of record in the file of this patent:

UNITED STATES PATENTS

| Number | Name | Date |
| --- | --- | --- |
| 1,052,579 | Gardner | Feb. 11, 1913 |
| 1,274,548 | Holnagel | Aug. 6, 1918 |
| 1,355,184 | Taliaferro | Oct. 12, 1920 |
| 1,720,956 | Heineke | July 16, 1929 |
| 1,721,193 | Thompson | July 16, 1929 |
| 1,756,561 | Larsen | Apr. 29, 1930 |
| 2,259,748 | Hullhorst | Oct. 21, 1941 |
| 2,284,286 | Krueger | May 26, 1942 |
| 2,454,285 | Krueger | Nov. 23, 1948 |
| 2,461,277 | Hohl | Feb. 8, 1949 |
| 2,471,098 | Davies | May 24, 1949 |